(12) United States Patent
Stenson et al.

(10) Patent No.: US 9,478,359 B2
(45) Date of Patent: Oct. 25, 2016

(54) PHASE CORRECTOR FOR LASER TRIMMING, AN INTEGRATED CIRCUIT INCLUDING SUCH A PHASE CORRECTOR, AND A METHOD OF PROVIDING PHASE CORRECTION IN AN INTEGRATED CIRCUIT

(71) Applicant: ANALOG DEVICES GLOBAL, Hamilton (BM)

(72) Inventors: Bernard Patrick Stenson, Limerick (IE); Paul Martin Lambkin, Carrigaline (IE); Colette J. Blaney, Croom (IE); John Beatty, Limerick (IE)

(73) Assignee: Analog Devices Global, Hamilton (BM)

( * ) Notice: Subject to any disclaimer, the term of this patent is extended or adjusted under 35 U.S.C. 154(b) by 267 days.

(21) Appl. No.: 14/102,132

(22) Filed: Dec. 10, 2013

(65) Prior Publication Data
US 2015/0158114 A1    Jun. 11, 2015

(51) Int. Cl.
*H01G 4/33* (2006.01)
*H01C 17/242* (2006.01)
*H01G 4/255* (2006.01)
*H01C 7/00* (2006.01)

(52) U.S. Cl.
CPC .............. *H01G 4/33* (2013.01); *H01C 17/242* (2013.01); *H01G 4/255* (2013.01); *H01C 7/006* (2013.01)

(58) Field of Classification Search
CPC ...... H01G 4/33; H01G 4/255; H01C 17/242; H01C 7/006
See application file for complete search history.

(56) References Cited

U.S. PATENT DOCUMENTS

| 4,272,775 | A | * | 6/1981 | Compton | .............. H01L 21/268 219/121.6 |
| 5,111,060 | A | * | 5/1992 | Asada | ................ H03K 19/0075 327/526 |
| 6,242,792 | B1 | * | 6/2001 | Miura | ..................... H01L 22/22 257/516 |
| 6,326,256 | B1 | | 12/2001 | Bailey et al. | |
| 2004/0207044 | A1 | * | 10/2004 | Ruggerio | ............. H01C 17/242 257/536 |

FOREIGN PATENT DOCUMENTS

WO    WO 2004-095543    11/2004

OTHER PUBLICATIONS

DeLuca, Phil, "A review of thirty-five years of laser trimming with a look to the future," Proceedings of the IEEE, vol. 90, No. 10, Oct. 2002, pp. 1614-1619.
Extended European Search Report of Apr. 28, 2015 for European Patent Application No. 14196659.8 filed Dec. 5, 2014. 5 pages.

* cited by examiner

*Primary Examiner* — Joshua King
(74) *Attorney, Agent, or Firm* — Knobbe, Martens, Olson & Bear, LLP

(57) ABSTRACT

A phase corrector for laser trimming a component, the phase corrector comprising:
a first correction structure located to a first side of the component, the first correction structure comprising first and second correction regions at first and second distances from the component; and
a second correction structure located to a second side the component, the second correction structure comprising third and fourth correction regions at third and fourth distances from the component.

20 Claims, 9 Drawing Sheets

| step under<br>step over | step under<br>no step over |
|---|---|
| no step under<br>step over | no step under<br>no step over |

FIG. 8

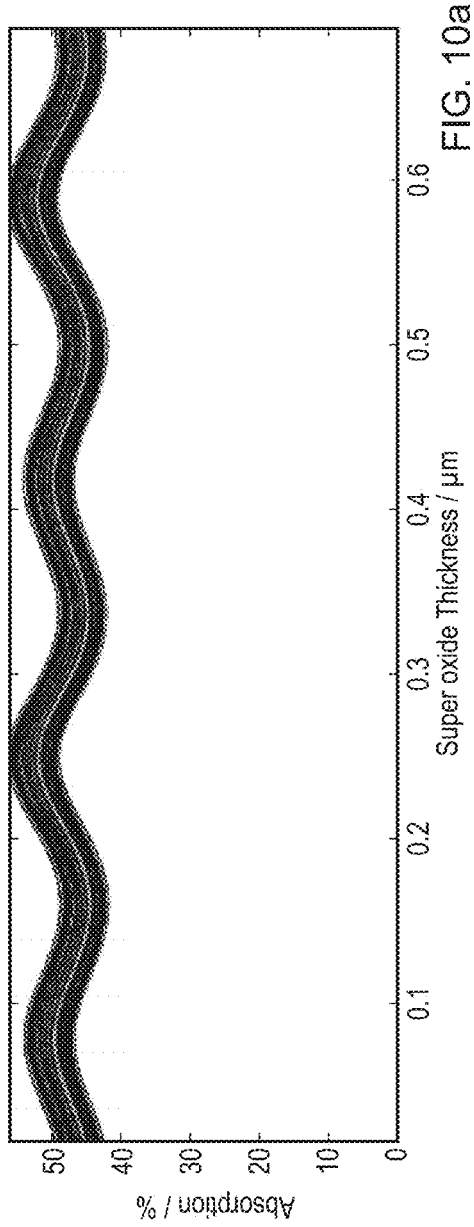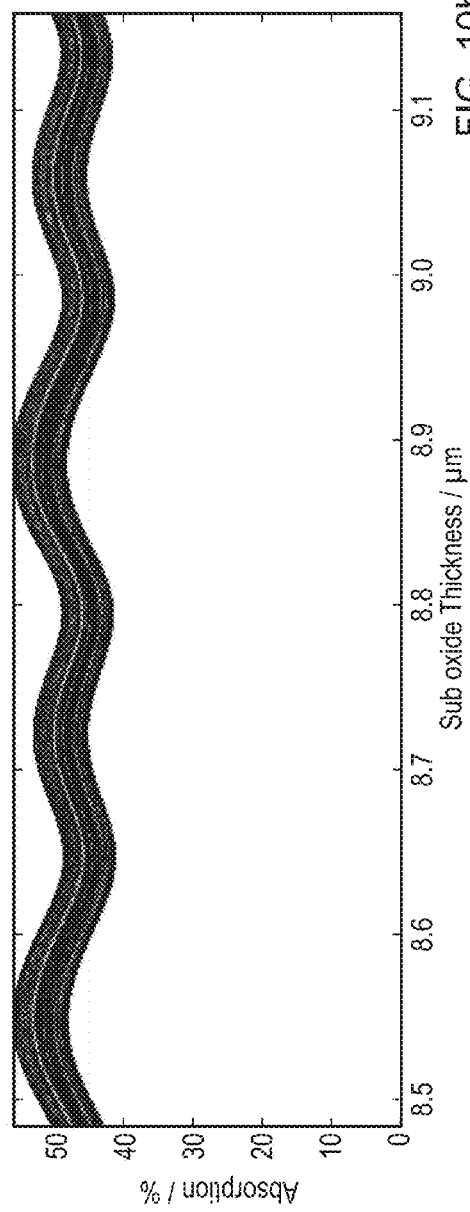

PHASE CORRECTOR FOR LASER TRIMMING, AN INTEGRATED CIRCUIT INCLUDING SUCH A PHASE CORRECTOR, AND A METHOD OF PROVIDING PHASE CORRECTION IN AN INTEGRATED CIRCUIT

FIELD

This disclosure relates to laser trimming of components within integrated circuits, and to integrated circuits having structures formed therein to facilitate laser trimming of components.

BACKGROUND

It is known that process variations within integrated circuit manufacture can cause components not to have a desired absolute value, and can also cause scaling between components on the same integrated circuit to vary from a desired ratio. It is also known to adjust the values of components after fabrication, but before packaging, by trimming techniques such as laser trimming.

Boundaries between different layers of material within an integrated circuit can give rise to reflections within the integrated circuit being trimmed. These reflections can interfere, both constructively and destructively with the light from the trimming laser. This gives rise to the possibility that some parts of the circuit being trimmed may lie at a region of destructive interference, and therefore may not be heated by the amount that is expected. Similarly, regions of the circuit adjacent the component that is being laser trimmed may be heated more than expected if they lie at regions of constructive interference. These interference effects may affect the time required to perform a laser trim, the outcome of the trimming operation, and the degree of potential damage to adjacent structures within the integrated circuit.

SUMMARY

In accordance with a first aspect of this disclosure there is provided a phase corrector for laser trimming a component, the phase corrector comprising: a first correction structure located to a first side of the component, the first correction structure comprising first and second correction regions at first and second distances from the component; and a second correction structure located to a second side of the component, the second correction structure comprising third and fourth correction regions at third and fourth distances from the component.

Advantageously the phase corrector is formed as part of an integrated circuit in which the component that is to be laser trimmed is also formed. The first correction structure may be located beneath the component. Thus, as the various processing steps in formation of the integrated circuit are performed, the first correction structure may be formed above a substrate, and prior to formation of the component that may be laser trimmed. The first correction structure may comprise at least one additional layer of material that is formed of varying thickness, or deposited, patterned and subsequently etched so as to leave regions where the additional material can be found interspersed with regions where it is not, or to leave regions of differing thickness. This can create a series of reflection boundaries in an alternating pattern of first and second heights above the substrate or beneath the component to be trimmed. The difference in height between the reflectors formed at the first and second correction regions may be selected to correspond to substantially one quarter of a wavelength of the laser light used to illuminate the component during laser trimming. The distance may advantageously be selected taking account of the refractive index of a medium through which the laser light passes to reach the first and second correction regions.

The second correction structure may be formed above the component that may be laser trimmed. A covering layer over the component may be formed with regions of variable thickness, or additional layers of material may be deposited in a pre-determined pattern above one or more layers formed over the component to be trimmed.

The first, second, third and fourth correction regions may be formed on a scale that is relatively small compared to the diameter of the laser beam being used (or expected to be used) to trim the component and the correction regions may be arranged such that at a first position the first and third correction regions are aligned, at a second position the first and fourth correction regions are aligned, at a third position the second and third correction regions are aligned, and at a fourth position the second and fourth correction regions are aligned. "Aligned" in this context means that light from the laser beam passes through or impinges on these various combinations of correction regions. Thus, phase changes of substantially a half wavelength are introduced between the first and second correction regions compared to each other, and similarly phase changes of substantially half wave length are introduced between the third and fourth correction regions compared to each other. These changes, being on a scale that is smaller than the diameter of the laser beam, act in use to provide four different regions with varying interference patterns therein such that absorption of the power of the laser beam as a whole becomes far more uniform at the component being trimmed when viewed at a scale comparable to the diameter of the laser beam.

In accordance with a further aspect of this disclosure there is provided an integrated circuit including a phase corrector.

In accordance with a further aspect of this disclosure there is provided a method of providing trimming correction for an integrated circuit, the integrated circuit including at least one laser trimmable component formed over a substrate, the method comprising: forming a first variable depth structure having optical discontinuities configured to introduce a path length change of substantially half a wave length to light reaching the first variable depth structure from a trim direction; forming the at least one laser trimmable component over the first variable depth structure; and forming a second variable depth structure over the at least one laser trimmable component, the second variable depth structure including a path length change of substantially half a wave length to light reflected from the component.

BRIEF DESCRIPTION OF THE DRAWINGS

Embodiments of phase correctors in accordance with the teachings of this disclosure will now be described, by way of non-limiting example only, with reference to the accompanying drawings, in which:

FIG. 8 schematically illustrates the combinations of phase corrector heights within an integrated circuit (for example as shown in FIG. 6 or 7) both beneath the trimmable component and above the trimmable component;

FIGS. 10a and 10b are graphs showing variations of absorption index with respect to variations in the thickness of the layers above and below the laser trimmable component.

DESCRIPTION OF SOME EXAMPLE EMBODIMENTS

Figure 1:
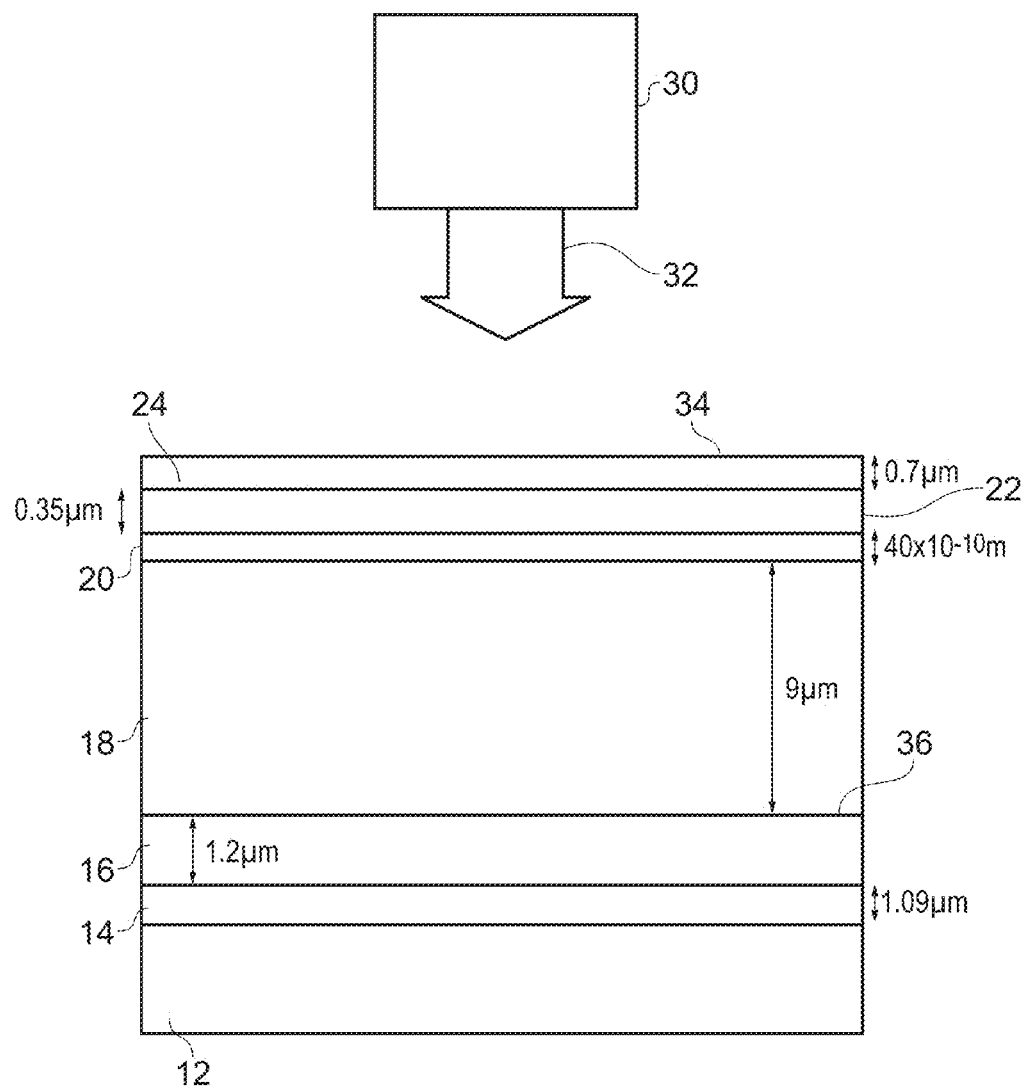
FIG. 1 one is a schematic diagram illustrating a typical configuration of an integrated circuit that does not have a phase corrector.

FIG. 1 schematically illustrates a cross section through an integrated circuit having a thin film resistor formed therein, where the resistor is trimmed by laser trimming. Thus the resistor is an example of a laser trimmable component. The arrangement of FIG. 1 comprises a first dielectric layer 14 which may be formed over a substrate 12 such as a semiconductor wafer. The first dielectric layer 14 may be formed of a first oxide, and may be provided as part of a semiconductor on insulator (SOI) fabrication process. In an SOI process a layer of silicon 16 (or other semiconductor) may be formed over the first dielectric layer 14. Active devices may be fabricated in the silicon layer 16. Next a relatively thick layer of dielectric 18 is deposited over the silicon layer 16. The relatively thick layer of dielectric 18 is typically subject to planarization in order to form a smooth surface upon which at least one trimmable component 20 is deposited. The or each trimmable component 20 may be formed of a thin film of a silicide, such Silicon-Chromium or materials such as Nickel-Chromium, formed over the relatively thick layer of dielectric 18. The thin film of material may be masked and etched to form at least one laser trimmable component 20. The film of silicide or other material forming the trimmable component 20 is typically in the region of 40 angstroms thick. Such a film is environmentally fragile and is protected by a further dielectric layer 22, such as a layer of oxide, which can be further covered by a passivation layer 24. The passivation layer 24 may be a layer of a suitable nitride. As known to the person skilled in the art, the relatively thick layer of dielectric 18 is typically an oxide, such as silicon oxide or silicon dioxide, and hence forth will be known as a "sub oxide" indicating that it is beneath the trimmable component 20, and the further dielectric layer 22 is often the same type of oxide as relatively thick layer of dielectric 18, an henceforth can be referred to as a "super oxide" indicating that it is above the trimmable component 20. The further dielectric layer 22 typically has a thickness of about 0.35 μm (micrometers). In use, when the arrangement shown in FIG. 1 is being trimmed, a laser 30 directs a beam of laser light 32 towards an upper surface 34 over the integrated circuit. The laser beam is typically a pulsed beam operating in the infra-red part of the spectrum and with a beam width of the order of several microns, typically around 10 microns, but other diameters are possible.

In non-SOI implementations, the sub-oxide layer 18 may be formed directly on the substrate 12.

Given that the laser trimmable component 20 is not at the surface of the integrated circuit, it is evident that the materials chosen for the layers above the trimmable component 20 must permit the propagation of light through them to enable the laser trimming to be performed. Thus, the laser light 32 should be able to pass through the layer of nitride 24 and the oxide 22. Given that the thin film of Silicon-Chromium or Nickel-Chromium is relatively thin, a significant proportion of the laser light 32 incident on the trimmable component 20 also passes through it. The layer 18 is of substantially the same material as the layer 22, and hence it also propagates the laser light 32 through it. Thus light which has propagated through the thin film that forms the trimmable component 20 meets an interface between the regions 16 and 18. This interface constitutes a discontinuity in terms of its refractive index with a laser light, and consequently a proportion of the laser light will be reflected from the interface between the layers 16 and 18. Similarly further reflections may occur at the interfaces between the layers 14 and 16 and between the layers 12 and 14. The bulk of the laser power reflection occurs at the interface between the layers 16 and 18, and hence these two dielectrics (or at least functionally similar layers) should be chosen to maximize the amount of reflection. A reasonable proportion of the laser energy which has passed through the thin film layer forming the trimmable component 20 is reflected back towards the thin film layer forming the trimmable component 20. The incident light from the laser and the reflected light from the interface 36 between layers 16 and 18 can form a standing wave pattern. Significant absorption of laser power occurs in the thin film when the thin film forming the laser trimmable component 20 is located at an antinodal point (region of constructive interference) in standing wave pattern. The position of the standing wave pattern depends on the relative thickness of the layers within the semiconductor component.

Figure 2:
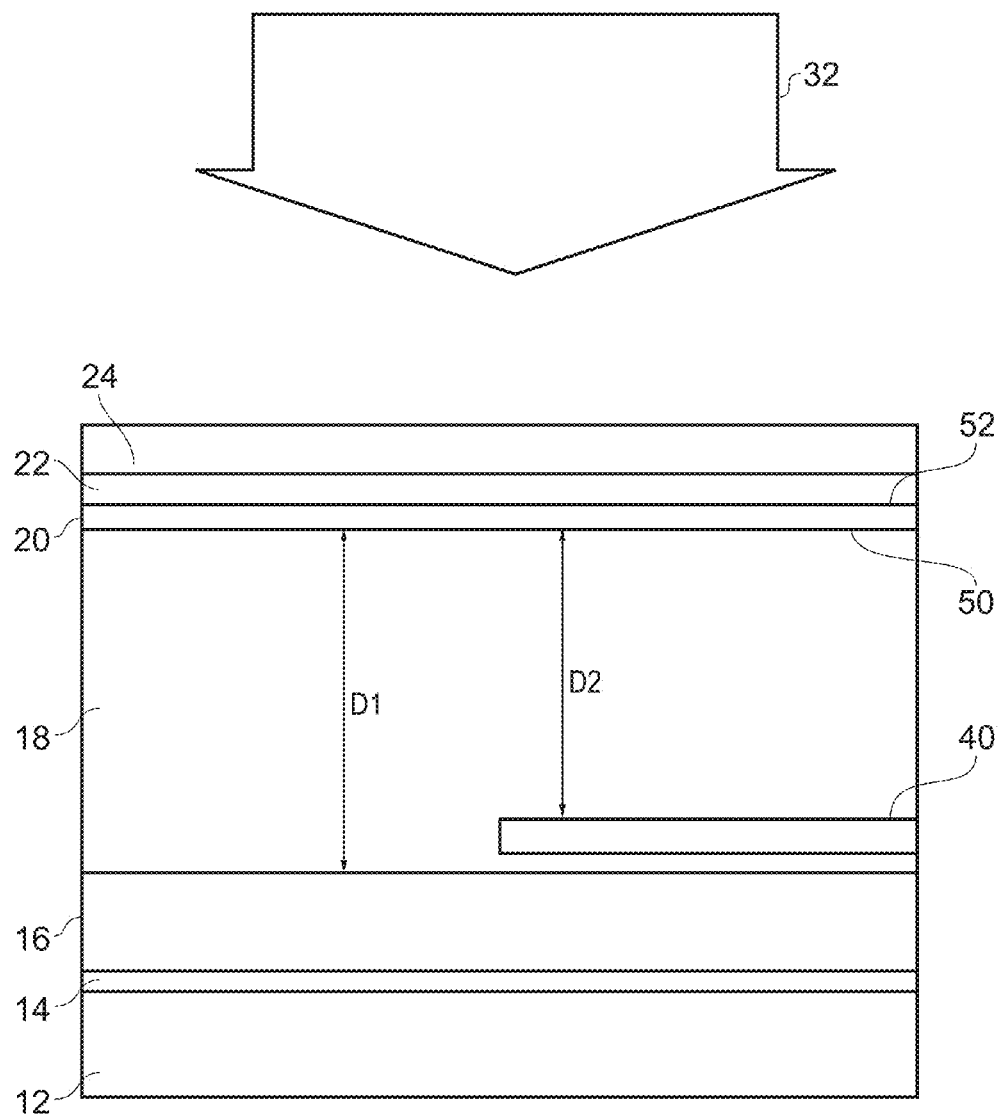
FIG. 2 schematically illustrates a known integrated circuit configuration including an integral phase corrector.

This problem has been recognized by other workers in the field, and US Patent Publication No. 2004/0207044 "Laser Trimming with Phase Shifters" and U.S. Pat. No. 6,242,792, "Semiconductor Device having an oblique portion as reflection" (sic) disclose structures formed beneath a thin film resistor in order to introduce phase shifts of substantially a quarter of a wavelength so as to turn a destructive interference condition into a non-destructive interference condition. Such an arrangement is schematically illustrated in FIG. 2, where for the sake of simplicity like parts have been designated with like reference numerals. Here an additional region 40, which can be a layer of silicon, has been formed just above the surface of the layer 16 of silicon, the region 40 not being continuous across the entire integrated circuit such that it forms step regions within the integrated circuit. Region 40 may be formed directly on the layer 16 and hence be part of it, or alternatively may be separated there from by a further region, for example, of the dielectric material that forms the region 18. Thus, this means that some regions of the material 18 have a thickness of D1, whereas other regions have a thickness D2, with a difference between D2 and D1 corresponding to substantially λ/4 where λ (lambda) is the wavelength of the laser light beam 32 in the dielectric layer 18. Other shifts of 3λ/4, 5λ/4, 7λ/4 and so on would also work from an optical perspective. As a consequence, if D1 were such that the thin film was at a node of a standing wave, then D2 would cause the portion of the thin film of the trimmable component 20 above region 40 to be at an antinode of the standing wave. If the laser beam straddles the step, as shown in FIG. 2, then at least part of the thin film will receive sufficient energy to trim it. However the inventors found that this technique does not work as expected nor as described, and that it does not work consistently will all components.

The compensation technique described thus far works adequately if the layer forming the trimmable component 20 is relatively thin. This means a thickness which is small (less than 10 to 15%) of the wavelength of the trimming laser. However, it should be realized that a discontinuity occurs at the interface 50 between the layer forming the component 20 and the oxide 18, and the interface 52 between layer forming the component 20 and the oxide 22. Each of these interfaces can give rise to a partial reflection of the incident laser light as well as partial transmission of it. When the film of the trimmable component 20 is relatively thin, for example in the region of 40 angstroms or so, then the path-length difference that occurs to the laser light as a result of the reflections at the interfaces 50 and 52 is relatively small, and hence it does not detract from the operation of the compensation formed by the region 40. However, the inventors realized that this convenient assumption breaks down as the thickness of the layer forming the component 20 gets thicker, for example greater than MO, as is the case with some classes of resistor technologies, such as low resistance resistors, or other trimmable components.

Some resistors, may be deposited as thicker layers in order to achieve the desired unit resistance. Some resistor technologies giving resistances of about 100Ω/☐ (Ohms per square) are formed using films of substantially 400 angstroms ($400 \times 10^{-10}$ meters) thickness. Under such conditions reflections occurring at interface 52 at an upper surface of the resistor can have a significant difference in path length compared to reflections occurring at interface 50 at a lower surface of the resistor (the trimmable component 20).

Figure 3:
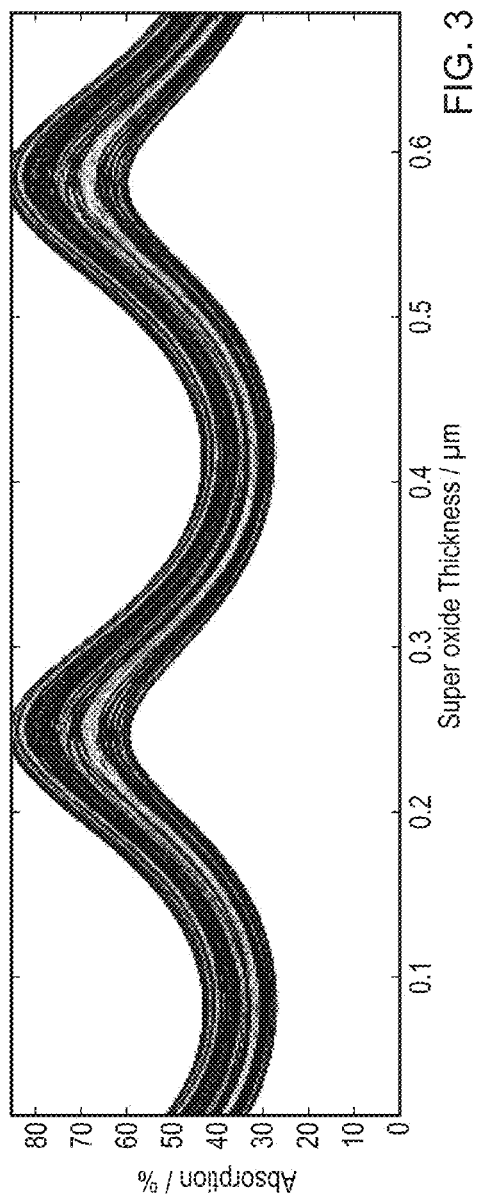
FIG. 3 is a graph illustrating percentage of light absorption versus super oxide thickness for a configuration similar to that shown in FIG. 1, but where the thickness of the trimmable component is sufficiently great to introduce phase shifts for reflections occurring at its upper and lower surfaces.
Figure 4:
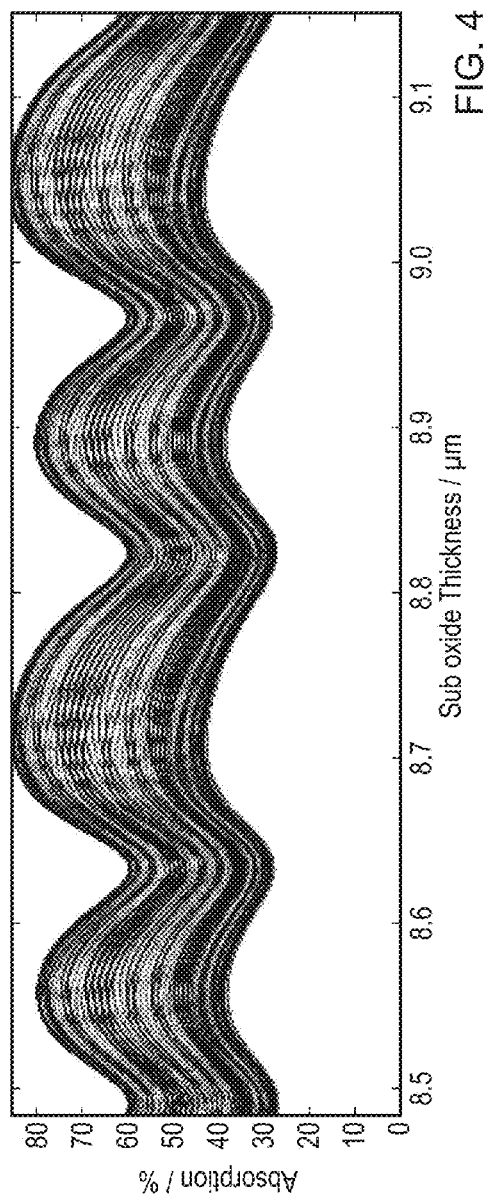
FIG. 4 is a plot of percentage absorption versus sub-oxide thickness for the case of FIG. 1 but where the thickness of the resistor is sufficient to give rise to substantial phase shifts as a result of reflection occurring at its upper and lower surfaces.
Figure 5:
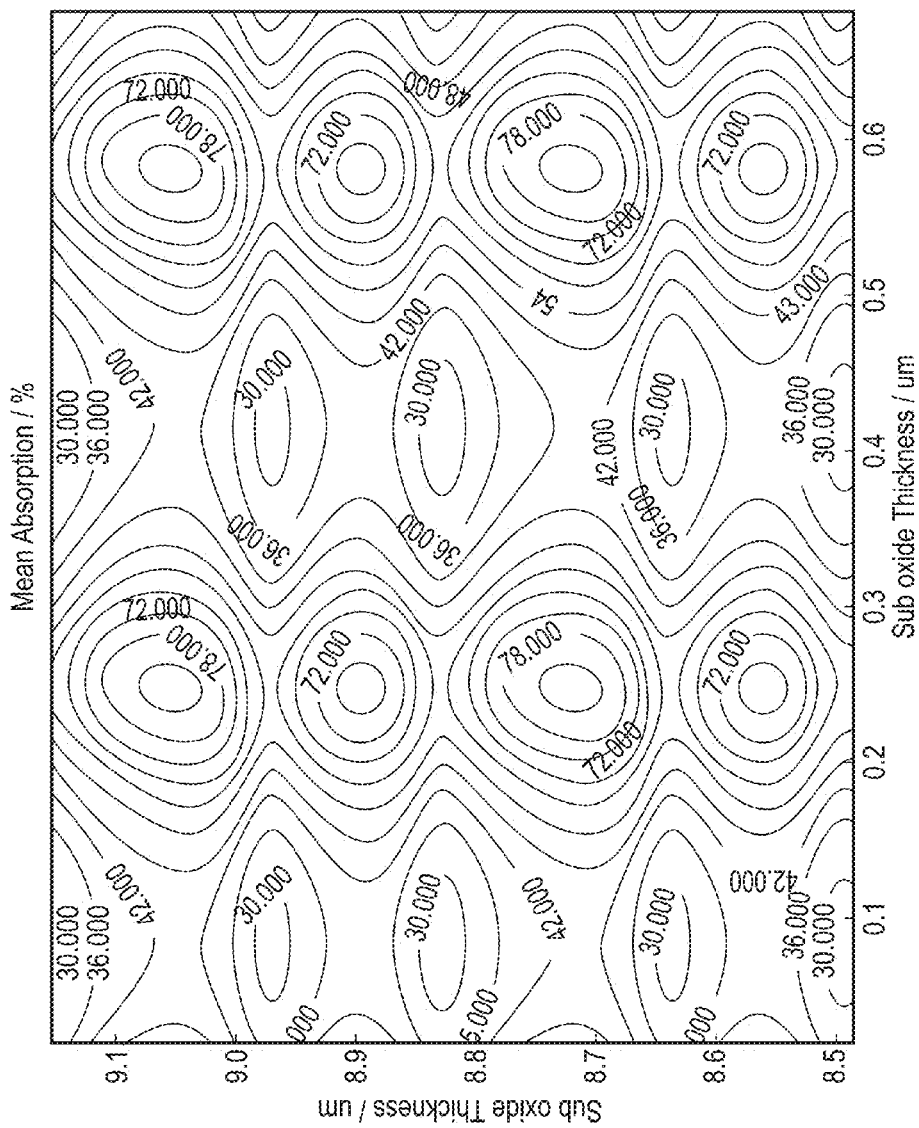
FIG. 5 is a plot mapping out the data of FIGS. 3 and 4 to show percentage absorption as function of both super oxide thickness (above the trimmable component) and sub oxide thickness (below the trimmable component)

In order to investigate this further, the inventors modeled the percentage absorption in a thick film resistor (where thick in this context means that the thickness of the film is within an order of magnitude of a quarter wavelength of the illuminating radiation). Percentage absorption has been plotted against the thickness of the super oxide layer (layer 22 in FIG. 1) over a range of 0 to 0.7 microns for various thicknesses of the sub oxide layer (layer 18 in FIG. 1) between 8.5 to 9.1 microns. It can be seen that peaks in absorption occur at super oxide thicknesses of around 0.25 and 0.58 microns irrespective of the thickness of the super oxide layer, although the thickness of the sub oxide layer does have a bearing on the percentage of absorption. Similarly FIG. 4 is a plot of absorption as a function of the sub oxide thickness, i.e. layer 18 of FIG. 1, for a range of thicknesses of the super oxide layer (0 to 0.7 microns). It can be seen that peaks in absorption occur at about 8.57 microns, 8.72 microns, 8.9 microns and 9.05 microns. The data of FIGS. 3 and 4 can be presented as an absorption map, as shown in FIG. 5 in which contours of absorption are shown as functions of both the super oxide thickness and the sub oxide thickness. It can be seen that, if the thicknesses of the sub oxide and super oxide are correctly chosen then absorption coefficients of up to 78% are achievable, whereas if they are incorrectly chosen, then the absorption coefficient may be limited to around 30%.

With this observation, it becomes possible to fabricate an integrated circuit having a phase corrector in accordance with the teachings of this disclosure. Such an arrangement is shown in FIG. 6.

Figure 6:
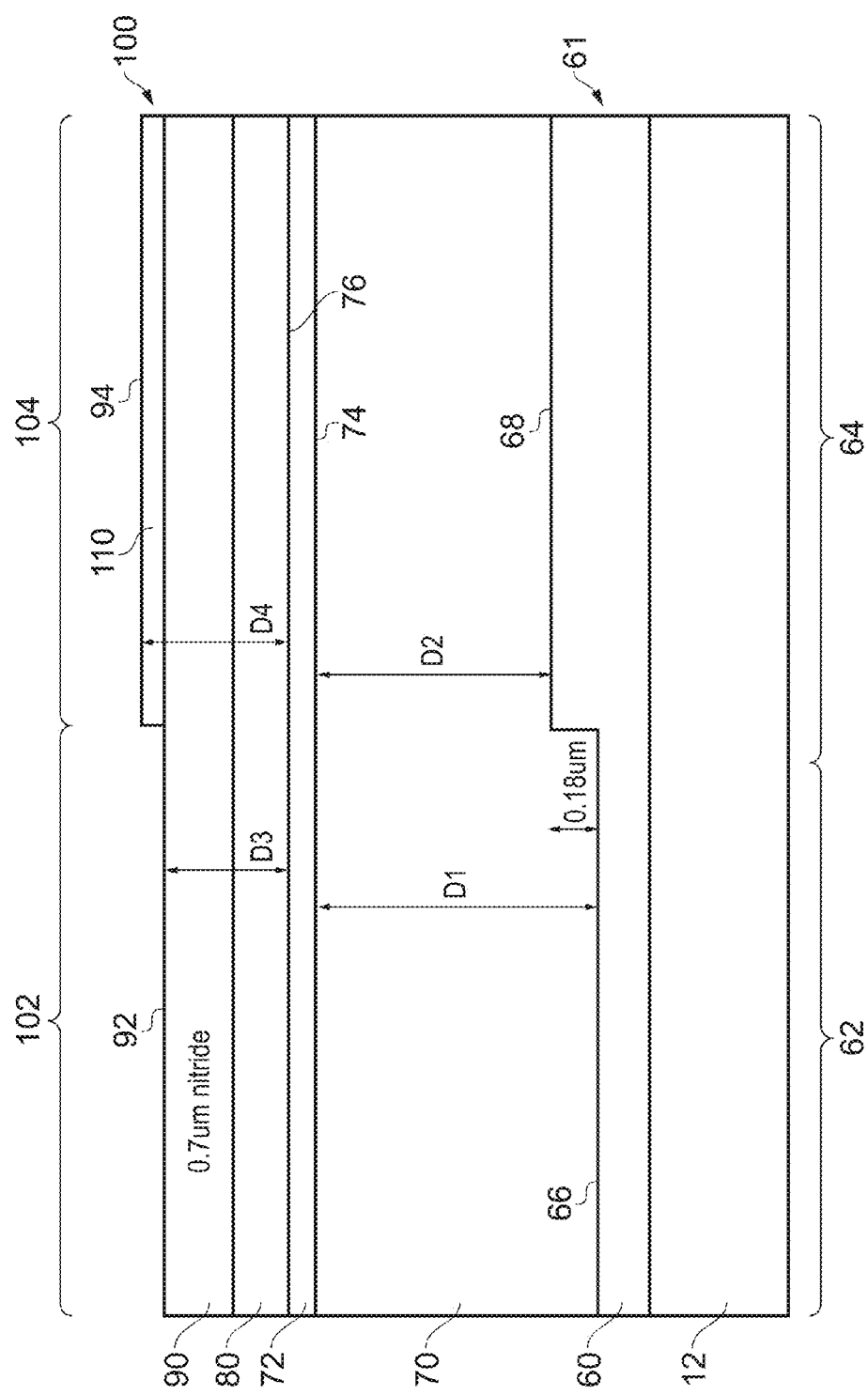
FIG. 6 is a cross sectional diagram of a first embodiment of an integrated circuit including a phase corrector constituting an embodiment of the present disclosure.

FIG. 6 schematically illustrates an integrated circuit which comprises a substrate, such as a silicon substrate 12 over which a first layer 60 has been provided. The first layer 60 may be dielectric, but other choices may be made by designer. Thus the layer 60 may be a semiconductor layer. The first layer 60 may be selectively etched, as shown in FIG. 6, or may have further layers of material deposited over parts of it, so as to form a first correction structure 61, which comprises a first correction region, generally designated 62, and a second correction region, generally designated 64. The first correction structure 61, and the other correction structures described herein, can include one or more steps that reduce or eliminate net interference from reflections at a layer interface during laser trimming, relative to reflections from a planar interface without such step(s). The first and second correction regions 62 and 64 extend by different heights from the substrate 12, and consequently in the finished device have surfaces 66 and 68 which are located at different distances from a laser trimmable component. Next a thicker layer 70 of material, such as a dielectric (for example, a silicon dioxide) is deposited over the first layer 60. Thus in this example the first correction structure comprises layers 60 and 70. An upper surface of the layer 70 may be subject to planarization in order to form a flat surface upon which the layer 72 of the laser trimmable component is deposited. The layer 72 may be several hundred angstroms or more thick. In one embodiment layer 72 is 400 angstroms thick layer of silicon chromium, but this is merely a non-limiting example of one resistor technology.

The layer 72 may then be covered with a further dielectric layer 80 which may form the surface of the device or which may be further covered with an additional protective layer 90, such as silicon nitride which may act as passivation. Layer 80 may be formed of an oxide, such as silicon dioxide similar to that used to form the layer 70, or it may comprise some other dielectric material. A lower surface 74 of the layer 72 forms a discontinuity with the layer 70. Similarly, an upper surface 76 of the layer 72 forms a discontinuity with the layer 80. Thus light arriving at these surfaces can undergo partial transmission and partial reflection. Some of the incident light from the laser may reflect from surface 74 and from surface 76 upwardly to upper surface 92 of the device, where further reflection may occur. In order to address potential interference problems resulting from reflections at the surfaces 74 and 76, a second correction structure is formed above the layer 72 which forms the trimmable component. The second correction structure, generally designated 100, comprises a third correction region 102 and a fourth correction region 104 formed by layers 90 and 110. Thus a reflecting surface of the third correction region, such as surface 92, occurs at a third distance from the trimmable component layer 72, whereas a reflecting surface 94 of the fourth correction region 104 occurs at a distance D4 from the trimmable component layer 72.

Distances D1 and D2 are selected so as to vary by substantially a quarter of a wave length of laser light (or an odd multiple thereof), taking account of the refractive index of the relevant material. Thus, this distance D1-D2 equals $2\lambda/4n$ where $\lambda$ (lambda) is the wavelength of light and n represents a refractive index of the material.

For a typical infrared laser used in laser trimming $\lambda$ equals approximately 1053 nanometers, the step height D1-D2 of the layer 70 of silicon oxide should be around 0.17 or 0.18 microns (or odd multiples thereof), whereas if the correction is formed in nitride, then the step height (such as D3-D4) should be around 0.13 microns, or odd multiples thereof. In the arrangement shown in FIG. 6, the second correction structure is formed by depositing a further layer of silicon nitride 110 to a thickness of around 0.13 microns over selected portions of the layer 90. In a chip fabricated by the inventors, the layer 70 was approximately 9 microns thick, the layer 80 was approximately 0.35 microns thick and the layer 90 was approximately 0.7 microns thick. Trimming wavelengths other than 1053 nanometers may be used and the step heights adjusted accordingly. For instance, the wavelength $\lambda$ of light emitted from a laser during trimming can be approximately 262 nanometers, 266 nanometers, 349 nanometers, 351 nanometers, 355 nanometers, 440 nanometers, 447 nanometers, 473 nanometers, 523 nanometers, 527 nanometers, 532 nanometers, 660 nanometers, 672 nanometers 946 nanometers, 1047 nanometers, 1064 nanometers, 1313 nanometers, 1320 nanometers, or 1340 nanometers. Accordingly, in certain embodiments, the step height in correction structures can be multiples of a quarter of any of these wavelengths or an odd multiple thereof, depending upon the laser wavelength employed for trimming.

The first correction structure may be formed directly in the substrate 12 by etching.

Figure 7:
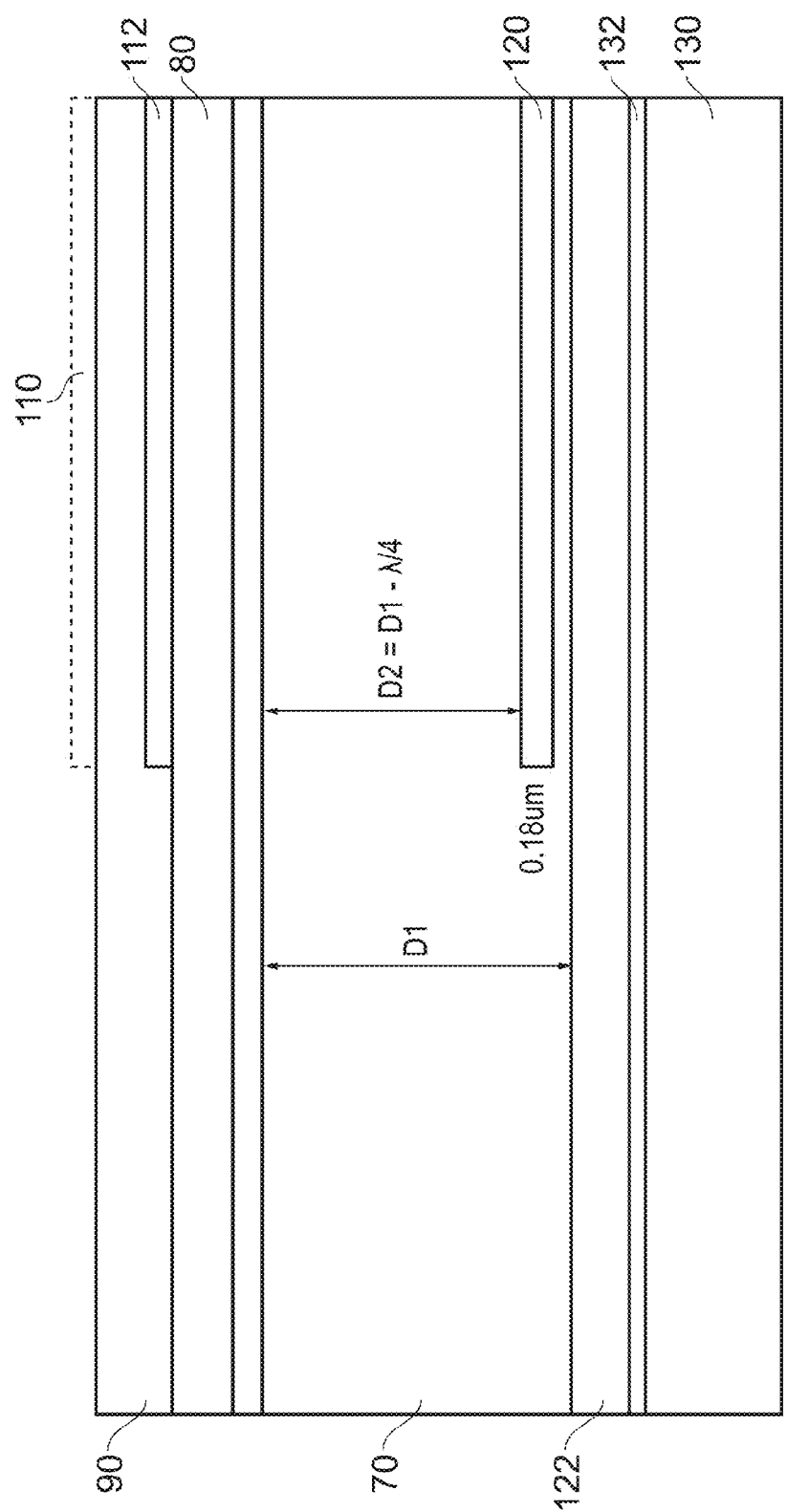
FIG. 7 schematically illustrates a cross section of a second embodiment of an integrated circuit including a phase corrector in accordance with the present disclosure.

In the arrangement shown in FIG. 6, the second correction structure is formed by forming an additional step 110 of silicon nitride over the nitride layer 90. However, as shown in FIG. 7 an additional step may be formed by adding thickness to the layer 80 by further depositing additional silicon dioxide over the layer 80, or by selective etching of it so as to form a step structure 112 over part of the layer 80. This may be in place of the region 110, or in addition to it if the relative thicknesses of the steps 110 and/or 112 are suitably adjusted. Furthermore, as shown in FIG. 7, the first correction structure may be formed by an additional layer of material 120, such as silicon, formed above layer 122, which may also be silicon. The region 120 may be deposited directly onto the layer 122 or may be separated therefrom by a further layer of material, such as the same material as used to form the dielectric layer 70. The semiconductor layer 122 need not be formed directly on to the silicon substrate as was the case in FIG. 6, but may be separated therefrom by one or more further layers of material, schematically illustrated as layer 132 which may be made of any number of layers of material deposited, for whatever reason, over the silicon or other semiconductor or non-semiconductor substrate 130, as may be the case with an SOI device. For example, for high frequency components the supporting substrate may be an insulating material, such as a glass and the structures disclosed herein may be formed on an upper surface of the glass substrate, or upon one or more layers which are supported by the glass substrate.

Referring back FIGS. 6 and 7, it can be seen that second correction region can be regarded as a step under the component, and the fourth correction region can be regarded as a step over the component. It follows that these features of steps under and steps over can be combined in up to four ways, as schematically illustrated in FIG. 8 so that the first combination has a step under the component and a step over the component, a second combination has a step under the component but no step over the component, a third combination has no step under the component but a step over the component and a fourth component has no step under the component and no step over the component. These combinations of steps under the component and over the component can be combined in a two dimensional spatial pattern whose dimensions are relatively small compared to the width of the laser beam such that at least two and preferably all of these combinations may be simultaneously illuminated by the beam. The horizontal dimensions of the pattern may be between 1 and 10 microns, but these ranges are not intended to be limiting and depend on the size of the structure being trimmed and the diameter of the laser beam.

The steps may be formed in a repeating pattern for simplicity (although this is not a necessary feature). The direction of the patterns may be orthogonal or parallel to one another. An embodiment where the step patterns are arranged in a one dimensional sequence will now be described with respect to FIG. 9.

Figure 9:
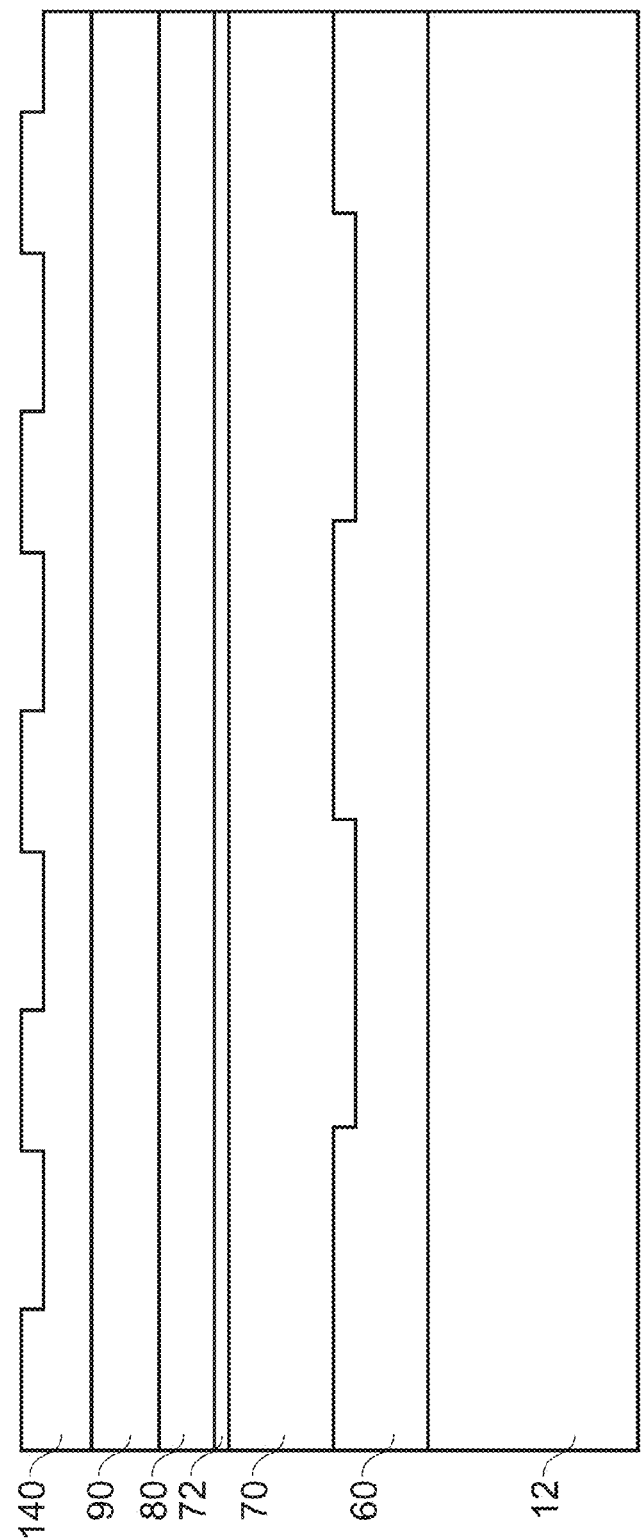
FIG. 9 is a cross section over a wider distance compared to the cross sections of FIGS. 6 and 7, showing the relative scales of the first and second correction instructions in integrated circuit constituting a further embodiment in accordance with the disclosure of this document.

FIG. 9 shows an arrangement where, for simplicity, a first step pattern is assumed to have been formed in the layer 60, and a second step pattern has been formed in a further layer 140 deposited over the nitride layer 90, although equally the second step pattern could have been formed within the layer 90 or indeed the layer 80. It can be seen that the spatial periodicity of the step patterns are different. In this example, the periodicity of the pattern of the first correction structure formed in the layer 60 is substantially twice the periodicity of the pattern of the second correction structure formed in the layer 130. For example, the first pattern has been selected to repeat every six microns, and the second pattern has been selected to repeat every three microns in the example shown in FIG. 9. However, the first pattern could have the shorter periodicity and the second pattern could have the longer periodicity if the manufacturer or designer so desired. The period of 6 microns is close to half the diameter of a typical 10 micron illuminating laser beam thereby ensuring that enough energy is delivered from the beam to the layer 72 in order to heat it sufficiently for trimming to be performed.

FIGS. 10a and 10b show the absorption response of the device shown in FIG. 9. In FIG. 10, the variation in absorption is shown as a function of the super-oxide thickness 80 for a range of thickness of the sub-oxide 70 from 8.5 to 9.15 microns. Similarly FIG. 10b shows the variation in absorption as a function of the sub-oxide thickness for super-oxide thicknesses in the range of 0 to 0.7 microns. In each case, the variation in absorption is reduced to around 15%. Consequently, the structures described herein enable more uniform heating to be delivered to the laser trimmable component compared, for example, to the structures of FIG. 1 and FIG. 2, which should manifest itself in greater accuracy of trimming.

It is thus possible to provide a trimming mask or phase correction structure which can be easily fabricated as part of an integrated circuit in order to improve the reliability of a trimming process and ensure that the variations in laser energy delivered to the trimmable component are much reduced. Although the description has focused for simplicity on trimming resistors, it will be appreciated that the conductive materials described herein can be used to form one or both plates of a capacitor, and hence one or both plates of such a capacitor may also be laser trimmable.

The systems, apparatus, and methods of phase correction are described above with reference to certain embodiments. A skilled artisan will, however, appreciate that the principles and advantages of the embodiments can be used for any other systems, apparatus, or methods with a need for phase correction.

Such systems, apparatus, and/or methods can be implemented in various electronic devices. Examples of the electronic devices can include, but are not limited to, consumer electronic products, parts of the consumer electronic products, electronic test equipment, wireless communications infrastructure, etc. Examples of the electronic devices can also include memory chips, memory modules, circuits of optical networks or other communication networks, and disk driver circuits. The consumer electronic products can include, but are not limited to, measurement instruments, medical devices, wireless devices, a mobile phone (for example, a smart phone), cellular base stations, a telephone, a television, a computer monitor, a computer, a hand-held computer, a tablet computer, a personal digital assistant (PDA), a microwave, a refrigerator, a stereo system, a cassette recorder or player, a DVD player, a CD player, a digital video recorder (DVR), a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic device can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Description of Some Example Embodiments using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

The teachings of the embodiments provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments have been described, these embodiments have been presented by way of example only, and are not intended to limit the scope of the disclosure. Indeed, the novel systems, apparatus, and methods described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. Accordingly, the scope of the present inventions is defined by reference to the claims.

What is claimed is:

1. A phase corrector for laser trimming a component, the phase corrector comprising:
   a first correction structure located beneath the component, the first correction structure comprising first and second correction regions at first and second distances from the component; and
   a second correction structure located above the component, the second correction structure comprising third and fourth correction regions at third and fourth distances from the component.

2. A phase corrector as claimed in claim 1, wherein the difference between the first and second distances is substantially a quarter of a wavelength of a laser light used to trim the component or an odd multiple thereof.

3. A phase corrector for laser trimming a component, the phase corrector comprising:
   a first correction structure located to a first side of the component, the first correction structure comprising first and second correction regions at first and second distances from the component; and
   a second correction structure located to a second side of the component, the second correction structure comprising third and fourth correction regions at third and fourth distances from the component, wherein the first and third correction regions are aligned at a first position.

4. A phase corrector as claimed in claim 1, in which the first correction structure comprises a first repeating pattern of the first and second correction regions.

5. A phase corrector as claimed in claim 4, in which the first repeating pattern repeats along a first direction with a first period.

6. A phase corrector as claimed in claim 4, in which the second correction structure comprises a second repeating pattern of the third and fourth correction regions.

7. A phase corrector as claimed in claim 6, in which the second repeating pattern repeats along a second direction with a second period.

8. A phase corrector as claimed in claim 1, in which the first, second, third and fourth correction regions are positioned such that:
   at a first position the first and third correction regions are aligned;
   at a second position the first and fourth correction regions are aligned;
   at a third position the second and third correction regions are aligned; and
   at a fourth position the second and fourth correction regions are aligned.

9. A phase corrector as claimed in claim 1, in which the phase corrector is provided as a part of an integrated circuit.

10. A phase corrector as claimed in claim 9, in which the first correction structure is formed as a first layer of variable thickness beneath the component, and the second correction structure is provided as a second layer of variable thickness above the component.

11. A phase corrector as claimed in claim 10, in which either or both of the first and second layer are discontinuous.

12. An integrated circuit comprising the phase corrector as claimed in claim 1, wherein the component is a laser trimmable resistor or capacitor.

13. An integrated circuit as claimed in claim 12, in which a difference between the first and second distances is substantially a positive odd integer multiple of 0.17 or 0.18 microns when the component is separated from the first correction structure by silicon dioxide, or substantially a positive odd integer multiple of 0.13 microns when the component is separated from the first correction structure by nitride.

14. An integrated circuit comprising the phase corrector as claimed in claim 3, wherein the component is a resistor or a capacitor, and in which a difference between the third and fourth distances is substantially a positive odd integer multiple of 0.17 or 0.18 microns when the component is separated from the second correction structure by silicon dioxide or substantially a positive odd integer multiple of 0.13 microns when the component is separated from the second correction structure by nitride.

15. An integrated circuit comprising:
 a component; and
 a phase corrector arranged for laser trimming the component at a wavelength of laser light, the phase corrector comprising:
  a first correction structure disposed on a first side of the component between the component and a substrate, the first correction structure comprising a first correction region at a first distance from the component and a second correction region at a second distance from the component; and
  a second correction structure disposed on a second side of the component that opposes the first side, the second correction structure comprising a third correction region at a third distance from the component and a fourth correction region at a fourth distance from the component;
  wherein the first correction structure and the second correction structure are arranged so as to cause interference from reflections associated with laser trimming to be reduced, and
  wherein a difference between the first distance and the second distance is substantially a first positive odd integer multiple of a quarter of the wavelength of the laser light used to trim the component, and wherein a difference between the third distance and the fourth distance is substantially a second positive odd integer multiple of the quarter of the wavelength of the laser light used to trim the component.

16. An integrated circuit as claimed in claim 15, wherein the first positive odd integer multiple and the second positive odd integer multiple are the same.

17. An integrated circuit as claimed in claim 15, wherein the component comprises a resistor or a capacitor.

18. A phase corrector as claimed in claim 3, wherein the difference between the third and fourth distances is substantially a quarter of a wavelength of a laser light used to trim the component or an odd multiple thereof.

19. A phase corrector as claimed in claim 3, wherein the first and fourth correction regions are aligned at a second position.

20. A method of laser trimming comprising applying laser light to the phase corrector of claim 3.

* * * * *